United States Patent
Park

(10) Patent No.: US 7,212,812 B2
(45) Date of Patent: May 1, 2007

(54) MOBILE COMMUNICATION TERMINAL INCLUDING TWO LAMPS FOR INCOMING CALL NOTIFICATION AND METHOD FOR PROVIDING GPS SERVICES USING THE SAME

(75) Inventor: Geun-Tae Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 163 days.

(21) Appl. No.: 10/760,976

(22) Filed: Jan. 20, 2004

(65) Prior Publication Data
US 2004/0157587 A1 Aug. 12, 2004

(30) Foreign Application Priority Data
Jan. 21, 2003 (KR) ............... 10-2003-0004046

(51) Int. Cl.
- H04M 3/42 (2006.01)
- H04M 1/00 (2006.01)
- H04B 1/38 (2006.01)

(52) U.S. Cl. .............. 455/415; 455/414.2; 455/567; 455/575.3

(58) Field of Classification Search ............ 455/412.2, 455/415, 575.3, 159.2, 159.1, 567
See application file for complete search history.

(56) References Cited

U.S. PATENT DOCUMENTS

| | | | |
|---|---|---|---|
| 5,805,067 A | * | 9/1998 | Bradley et al. ............ 340/635 |
| 6,240,297 B1 | * | 5/2001 | Jadoul ...................... 455/466 |
| 6,600,662 B1 | * | 7/2003 | Emmert et al. ............ 361/814 |
| 6,944,481 B2 | * | 9/2005 | Hama et al. ............... 455/566 |
| 7,161,496 B2 | * | 1/2007 | Bocking et al. ........ 340/815.45 |
| 2003/0050039 A1 | * | 3/2003 | Baba et al. ................ 455/404 |
| 2003/0148772 A1 | * | 8/2003 | Ben-Ari ..................... 455/456 |

FOREIGN PATENT DOCUMENTS

JP 2002064599 * 2/2002

* cited by examiner

Primary Examiner—Barry Taylor
(74) Attorney, Agent, or Firm—The Farrell Law Firm

(57) ABSTRACT

Disclosed are a mobile communication terminal including two lamps and a method for providing GPS services using the terminal, so as to promote users' convenience while providing various kinds of services. The device and method aim to support increasingly-diversified services of mobile communication terminals and particularly to allow the two lamps to be applied in providing services such as a GPS service which need to provide information indicating two navigation directions. Two lamps for incoming call notification are mounted on the external of the terminal. Each of the lamps is composed of a light emitting element. A display controller is provided inside the terminal for controlling the two lamps.

8 Claims, 4 Drawing Sheets

MOBILE COMMUNICATION TERMINAL INCLUDING TWO LAMPS FOR INCOMING CALL NOTIFICATION AND METHOD FOR PROVIDING GPS SERVICES USING THE SAME

PRIORITY

This application claims priority to an application entitled "MOBILE COMMUNICATION TERMINAL INCLUDING TWO LAMPS FOR INCOMING CALL NOTIFICATION AND METHOD FOR PROVIDING GPS SERVICES USING THE SAME", filed in the Korean Industrial Property Office on Jan. 21, 2003 and assigned Serial No. 2003-4046, the contents of which are hereby incorporated by reference.

BACKGROUND OF THE INVENTION

1. Field of the Invention

The present invention relates to a mobile communication terminal and a method for providing services for the mobile communication terminal, and more particularly to a display device of a mobile communication terminal and a method for providing services for the mobile communication terminal, which promotes users' convenience while providing various kinds of services.

2. Description of the Related Art

FIG. 1 is an exemplary block diagram showing the configuration of a general mobile communication terminal. Referring to FIG. 1, a controller 100 of the mobile terminal performs and controls processes for implementing various functions including a GPS (Global Positioning System) function, as well as a telephone communication function and a wireless Internet access function. A memory 102 includes a ROM (Read Only Memory), a RAM (Random Access Memory), and a flash RAM. The ROM stores various reference data and micro codes of a program for implementing the processing and control by the controller 100. The RAM serves as a working memory of the controller 100. The flash RAM provides a storage region for storing various updatable backup data including multimedia data.

A voice processing section 104 connected to the controller 100 performs processing for telephone communication, voice recording, and outputting of an incoming call notification sound, etc., through a microphone MIC and a speaker SPK. A display section 106 displays received data or information desired to be currently displayed. A key input section 108 includes number keys from 1 to 10 and various function keys such as a menu key, a call transmission key, a delete key, a call termination/power-off key, and volume up/down keys, and special keys such as * and #, and provides key input data according to the user's selection to the controller 100. A wireless communication module 110 performs processes for receiving and transmitting wireless signals from and to a mobile communication network through an antenna.

Notably, mobile communication terminals of the prior art include only one lamp for incoming call notification. The function of the lamp is limited to display for incoming call notification and display of a call connection status. Thus, the mobile communication terminals of the prior art cannot support services of mobile communication terminals that are increasingly diversified. For example, a GPS service called "Nate Drive" is currently provided by a service provider "SK telecom" in Korea, which provides GPS information through voice prompts and visual prompts via a LCD (Liquid Crystal Display) screen of a mobile phone. However, the GPS information voice prompts may be confused with or obscured by peripheral sounds, such as music or noise caused by vehicle operation. The LCD screen of the phone is too small to provide additional navigation direction information because there is already lots of existing information, such as a map to be displayed on the LCD screen. Thus, it is necessary to develop a new unit for indicating navigation directions in a mobile communication terminal. If a lamp for incoming call notification is used as a separate display section, other than the voice and the LCD screen, for providing services such as a GPS service which need to provide information indicating two navigation directions, it will be possible to provide a GPS service with an improved visibility.

SUMMARY OF THE INVENTION

The present invention has been made to meet such demand, and it is an object of the present invention to provide a mobile communication terminal including two lamps for incoming call notification and a method for providing a GPS service using the mobile communication terminal, which can support increasingly-diversified services of mobile communication terminals and, particularly, which allows the two lamps to be applied in providing services such as a GPS service which need to provide information indicating two navigation directions.

It is another object of the present invention to provide a mobile communication terminal including two lamps for incoming call notification and a method for providing a GPS service using the mobile communication terminal, which promotes users' individuality and convenience using two lamps for incoming call notification.

It is yet another object of the present invention to provide a mobile communication terminal including two lamps for incoming call notification and a method for providing a GPS service using the mobile communication terminal, wherein the two lamps for incoming call notification are applied in displaying GPS information, so as to accurately provide GPS information to the user even when it is difficult to discriminate voice information, for example, due to noise existing in a corresponding vehicle.

In accordance with the present invention, the above and other objects can be accomplished by the provision of a mobile communication terminal including two lamps for incoming call notification externally mounted on the mobile communication terminal, each of the lamps including a light emitting element, and display control means internally mounted on the mobile communication terminal for controlling the two lamps.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted to avoid making the subject matter of the present invention unclear.

Figure 2:
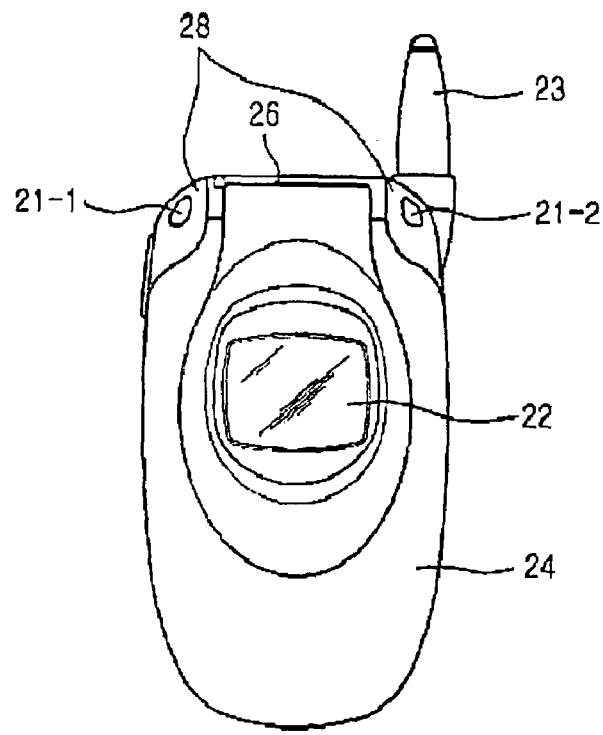
FIG. 2 is an exemplary view showing a mobile communication terminal including two lamps for incoming call notification according to the present invention.

FIG. 2 is an exemplary view showing a mobile communication terminal including two lamps for incoming call notification according to the present invention. As shown in FIG. 2, the mobile communication terminal includes two lamps for incoming call notification, 21-1 and 21-2, and also includes an external display window 22 and an antenna section 23.

When the present invention is applied to a folder-type mobile communication terminal, as shown in FIG. 2, having a front folder 24 that includes a center hinge arm 26. The front and rear folders of the terminal are mechanically connected by a hinge device. The two lamps 21-1 and 21-2 which are located at left and right-side hinge arms 28, respectively, of the rear folder of the terminal having an internal space of predetermined dimensions therebetween, so that the two lamps 21-1 and 21-2 can be seen even when the folder is opened.

When the present invention is applied to a flip-type mobile communication terminal, the two lamps are located at left and right sides, respectively, above a LCD section of a terminal case.

Figure 3:
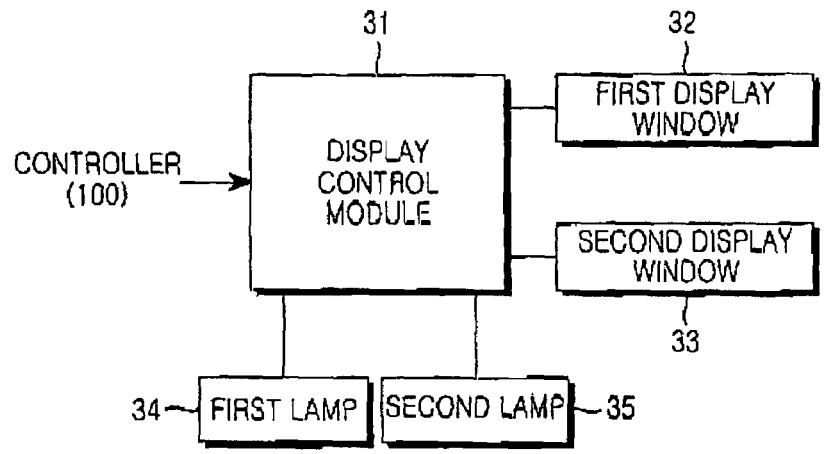
FIG. 3 is a detailed block diagram showing a display section of the mobile communication terminal which includes two lamps for incoming call notification.

FIG. 3 is a detailed block diagram showing the display section of the mobile communication terminal which includes two lamps for incoming call notification.

Figure 1:
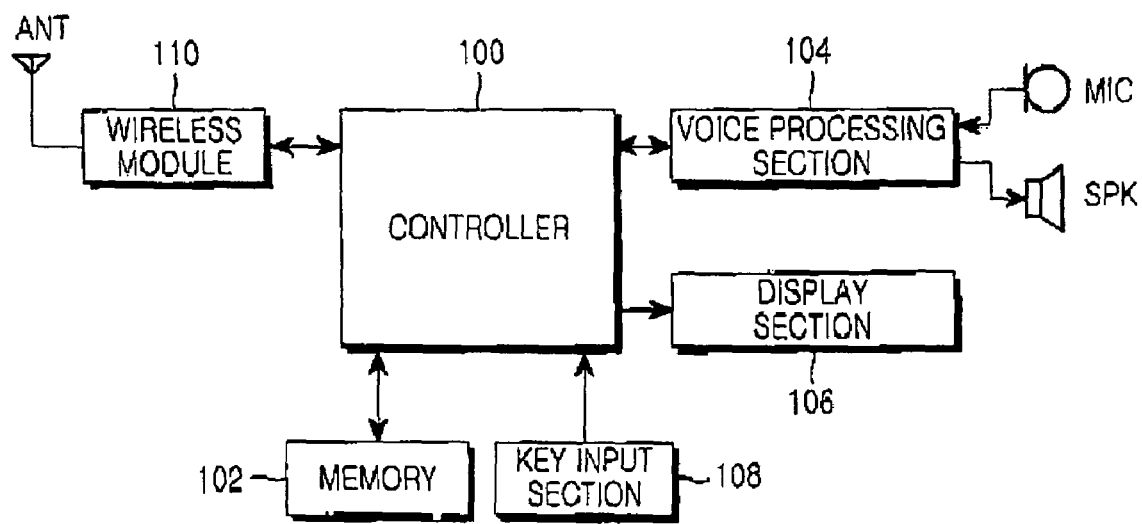
FIG. 1 is an exemplary block diagram showing the configuration of a general mobile communication terminal.

The display section 106 (FIG. 1) of the mobile communication terminal includes a display control module 31, first and second display windows 32 and 33, and two lamps 34 and 35 for incoming call notification. The display control module 31 controls the operation of each display element according to control signals from the controller 100. The first display window 32 is located inside the folder to display a main phone screen. The second display window 33 is located outside the folder to display additional information, such as the present time.

According to the embodiment of the present invention, the mobile communication device includes the two display windows 32 and 33 and two lamps 34 and 35 for incoming call notification, but it is possible to omit the second display window 33.

The display control module 31 controls the overall operation of the first and second display windows 32 and 33, and the two lamps 34 and 35 for incoming call notification. The following description of the embodiment of the present invention focuses on the functions and control signals of the two lamps 34 and 35.

The mobile communication terminal includes two lamps for incoming call notification, as shown in FIGS. 2 and 3, can be applied to provide various services through the two lamps. By controlling the emission operation of the two lamps when an incoming call notification or an outgoing call origination occurs, the mobile communication terminal can satisfy the user's desires to express his or her individuality, like a 40-harmonic bell sound and a color ring sound. For example, the display control module 31 can control the operation of the two, i.e. left and right, lamps 34 and 35 in such a manner that the two lamps blink alternately when an incoming call termination or an outgoing call origination occurs. When each of the two lamps 34 and 35 is composed of light emitting elements of each capable of emitting various colors, the two lamps may be controlled to change their colors, while blinking alternately.

Figure 4:
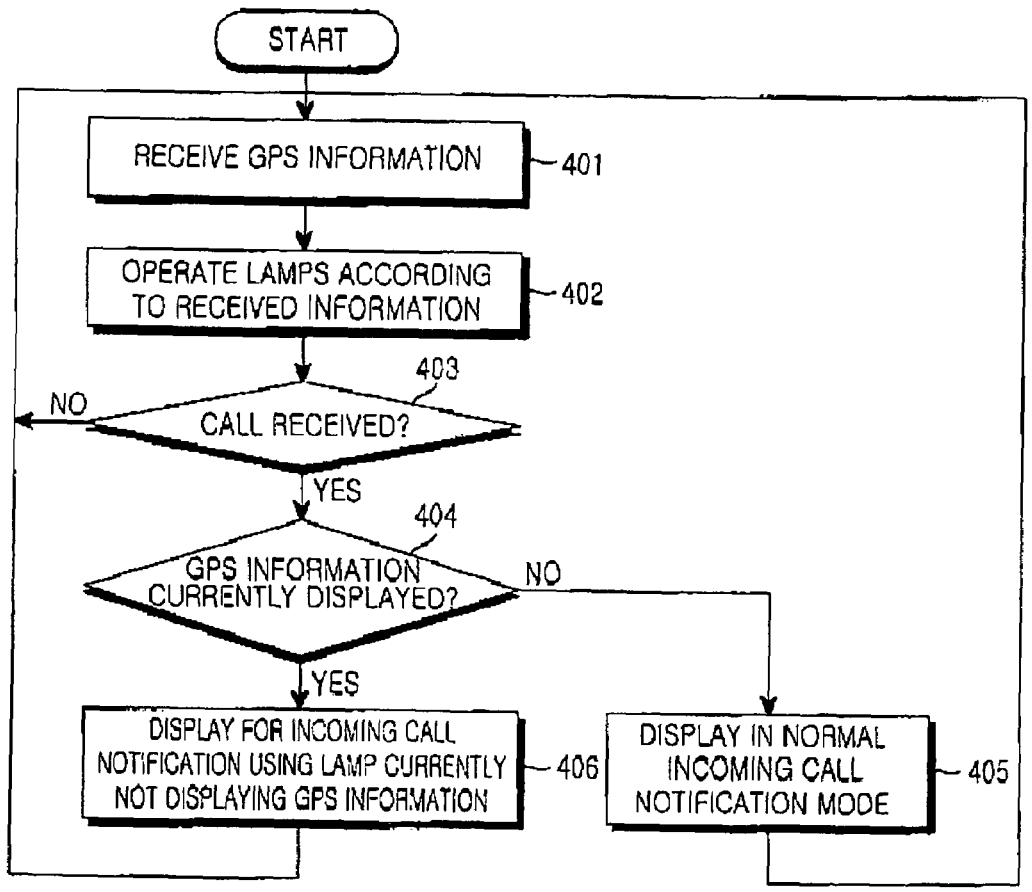
FIG. 4 is a flow chart showing the procedure of a method for providing a GPS service using a mobile communication terminal including two lamps for incoming call notification, according to an embodiment of the present invention.

FIG. 4 is a flow chart showing the procedure of a method for providing a GPS service using a mobile communication terminal including two lamps for incoming call notification, according to another embodiment of the present invention.

Firstly, the mobile communication terminal receives GPS information from a GPS service provider at step 401. A general GPS service is provided using received GPS information in such a manner that a map and a navigation arrow indicating a left-turn or right-turn are displayed on the LCD display window, while providing an audio voice signal of the corresponding information. According to the present invention, when the right-turn or left-turn arrow is displayed, the two (left and right) lamps 34 and 35 emit light in concert with the display of the arrow, improving visibility of GPS information at step 402.

On the other hand, since an incoming call may be received even while receiving the GPS information, the terminal checks whether an incoming call signal for establishing a call connection is received by the terminal at step 403. When an incoming call signal is not received by the terminal, the terminal continues to receive the GPS information or stays in a standby state, whereas when an incoming call signal is received by the terminal, the terminal checks whether the two lamps for incoming call notification are currently displaying the GPS information at step 404.

When one of the two lamps is currently displaying the GPS information (e.g. right-turn or left-turn information), the lamp that currently is not displaying the GPS information is controlled to emit light of a different color at step 406. For example, when the first lamp 34 of the two lamps currently emits green light, for example through a green light emitting diode (LED), for providing the GPS information, the second lamp 35 emits red light, for example through a red LED, for incoming call notification. The lamps may be activated, combined with the generation of a bell sound notifying an incoming call termination.

When the checked result of step 404 is that neither of the two lamps are currently displaying the GPS information, the two lamps operate in a normal incoming call notification mode at step 405. In detail, when an incoming call termination occurs, the left and right lamps blink alternately, or only one of the two lamps emits light.

According to the present invention, an external display device, interconnected with the two lamps for incoming call notification, may be mounted on a cradle or a separate external device in a vehicle, in order to provide an improved GPS service and completely and accurately carry visual navigation direction information to the user. This configuration may be easily implemented by controlling the operation of the external device through signals for controlling the first and second lamps 34 and 35 of FIG. 3.

Figure 5A:
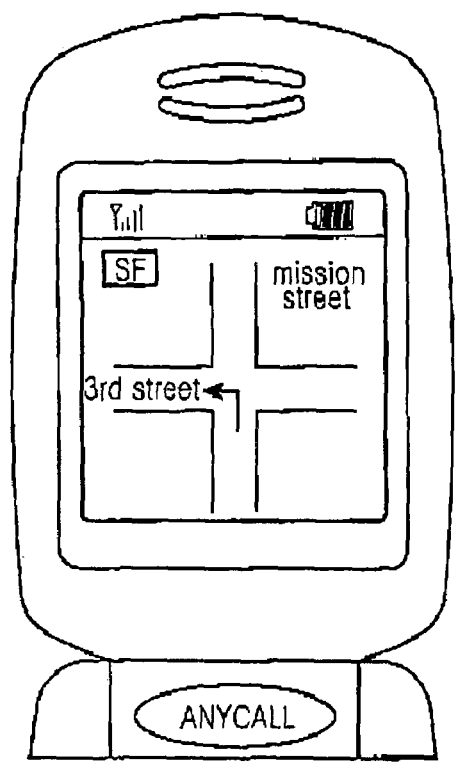
FIGS. 5a and 5b are examples of the GPS service being provided using a mobile communication terminal including two lamps for incoming call notification, according to the present invention.
Figure 5B:
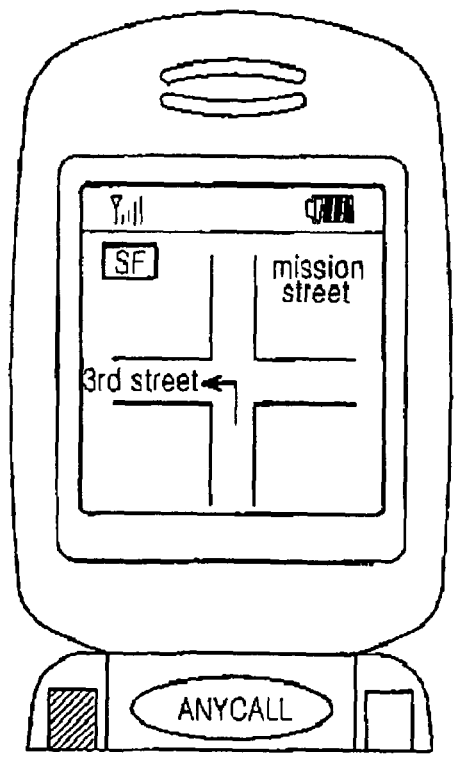

FIGS. 5a and 5b are examples of the GPS service being provided using a mobile communication terminal including two lamps for incoming call notification, according to the present invention. As shown in FIG. 5a, when the terminal receives information of a signal indicating the left turn while receiving GPS information, a GPS service is provided in such a manner that the LCD screen of the terminal displays information indicating the left turn. A speaker also outputs a voice message corresponding to the information, for example, "turn left in 300 m". According to the present invention, one of the two lamps emits light for indicating the left turn, as shown in FIG. 5b, which is combined with the output of the voice information and the display of the information on the LCD screen, to allow the user to more easily recognize the information even when it is difficult to discriminate the voice information.

Figure 6A:
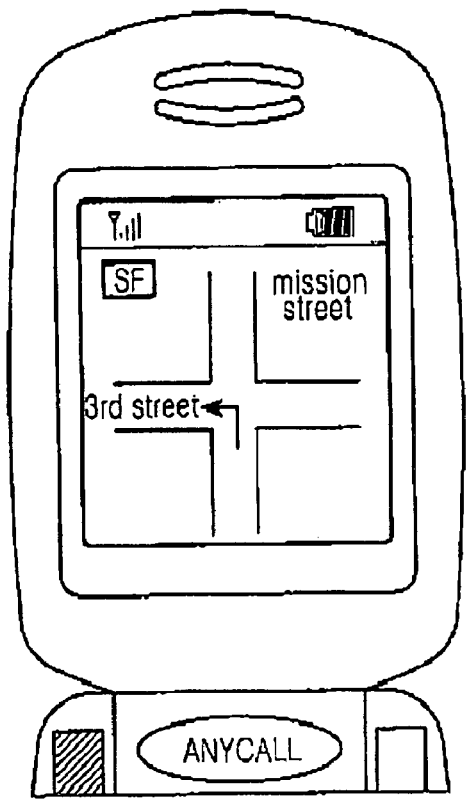
FIGS. 6a and 6b are other examples of the GPS service being provided using a mobile communication terminal including two lamps for incoming call notification, according to the present invention.
Figure 6B:
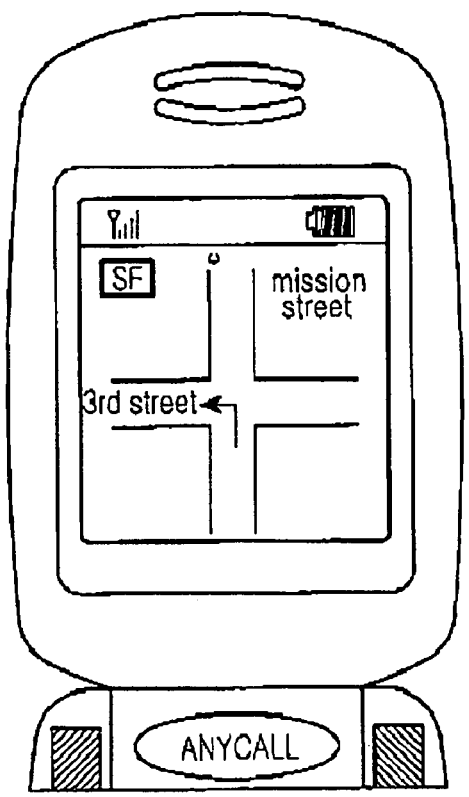

FIGS. 6a and 6b are other examples of the GPS service being provided using a mobile communication terminal including two lamps for incoming call notification, according to the present invention. In this example, incoming call notification information can be provided even while GPS information is displayed. In detail, if the terminal receives an incoming call signal while the left lamp, e.g. the first lamp 34, emits light of a certain color for providing the GPS information, the right lamp, e.g. the second lamp 35, which currently is not displaying the GPS information will emit light of a color that is different from the color of the left lamp, so as to notify the user of the incoming call, as shown in FIG. 6a. In this example, the lamps may be activated, combined with the generation of a bell sound notifying the incoming call termination.

As apparent from the above description, the present invention can promote users' individuality and convenience by providing a mobile communication terminal using two lamps for incoming call notification.

In addition, the two lamps for incoming call notification can be applied in displaying GPS information, so as to accurately provide GPS information to the user even when it is difficult to discriminate voice information, for example, due to ambient noise of the vehicle.

The method according to the present invention can be embodied as a program, which can be stored in a recording medium, such as a CD ROM, a RAM, a floppy disk, a hard disk, an optical magnetic disk, etc., in the computer-readable format.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal including first and second lamps for an incoming call, a left-turn and a right-turn indication, the terminal comprising:
   the first and second lamps being externally mounted on the mobile communication terminal, each of the lamps including a light emitting element; and
   display control means internally mounted on the mobile communication terminal for individually controlling the lamps including activating the first and second lamps as left and right lamps corresponding to extracted left-turn and right-turn information to provide navigation direction,
   wherein the terminal is in a GPS (Global Positioning System) mode and the second lamp emits a color different than a color emitted by the first lamp when the first lamp indicates a left-turn or right-turn, and the lamps operate in a normal incoming call indication mode when the lamps do not indicate a left-turn or right-turn.

2. The mobile communication terminal as set forth in claim 1, further comprising:
   a front folder including a center hinge arm;
   a rear folder including two side-hinge arms having an internal space of predetermined dimensions; and
   a hinge device mechanically connecting the front folder with the rear folder, said lamps being provided on the side-hinge arms of the rear folder.

3. The mobile communication terminal as set forth in claim 1, wherein each of said lamps includes a predetermined number of light emitting elements of different colors.

4. The mobile communication terminal as set forth in claim 3, wherein the displaycontrol means controls the lamps to emit light alternately when an incoming call signal is received.

5. The mobile communication terminal as set forth in claim 1, wherein the left-turn and right-turn indication is provided by Global Positioning System (GPS) information from a GPS service provider.

6. A method for providing Global Positioning System (GPS) services using a mobile communication terminal which includes two lamps for incoming call notification, the method comprising the steps of:
   a) receiving GPS information from a GPS service provider;
   b) extracting left-turn and right-turn information from the GPS information;
   c) activating the two lamps as left and right lamps in concert with the extracted left-turn and right-turn information to provide navigation direction;
   d) checking whether a call signal for establishing a call connection is received;
   e) if the checked result of step d) is that the call signal is received, checking whether GPS information is currently displayed through the two lamps;
   f) if the checked result of step e) is that a first lamp of the two lamps currently displays GPS information including left-turn or right-turn information, allowing a second lamp of the two lamps to emit light that is a different color than the color of said first lamp; and
   g) if the checked result of step e) is that the two lamps are not displaying GPS information, operating the two lamps in a normal incoming call notification mode.

7. The method as set forth in claim 5, wherein the steps are performed using an external display device interconnected with the two lamps, the external display device being mounted on a cradle of the mobile communication terminal.

8. The method as set forth in claim 6, wherein the steps are performed using an external display device interconnected with the two lamps, the external display device being externally mounted on the mobile communication terminal.

* * * * *